Sept. 9, 1952  A. I. KEGAN ET AL  2,609,789
APPARATUS FOR RESURFACING PLASTIC
RECORD BELTS AND THE LIKE
Filed Feb. 1, 1950  4 Sheets-Sheet 3

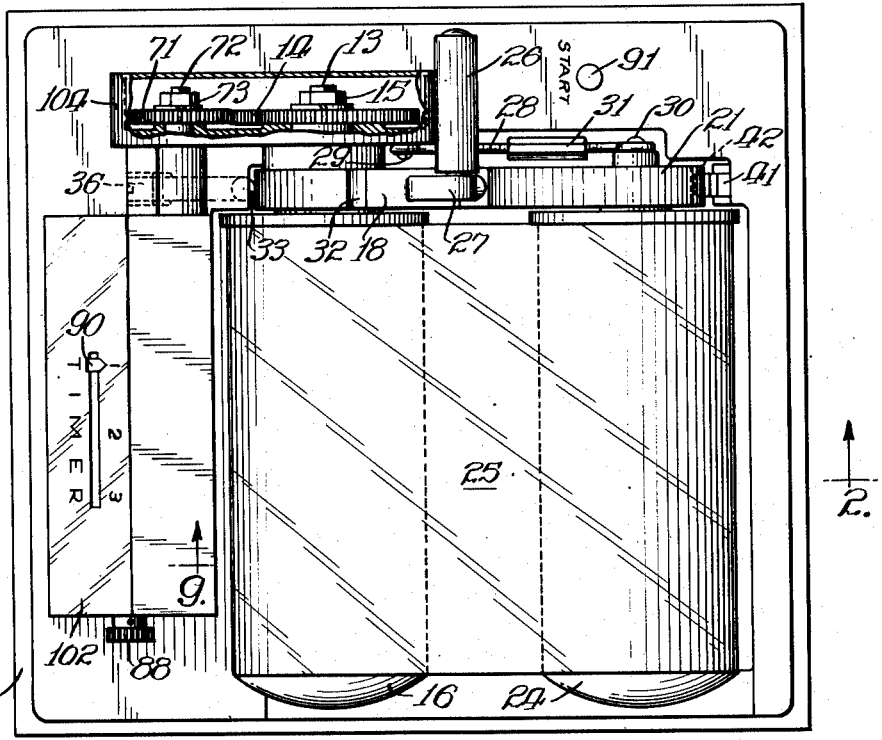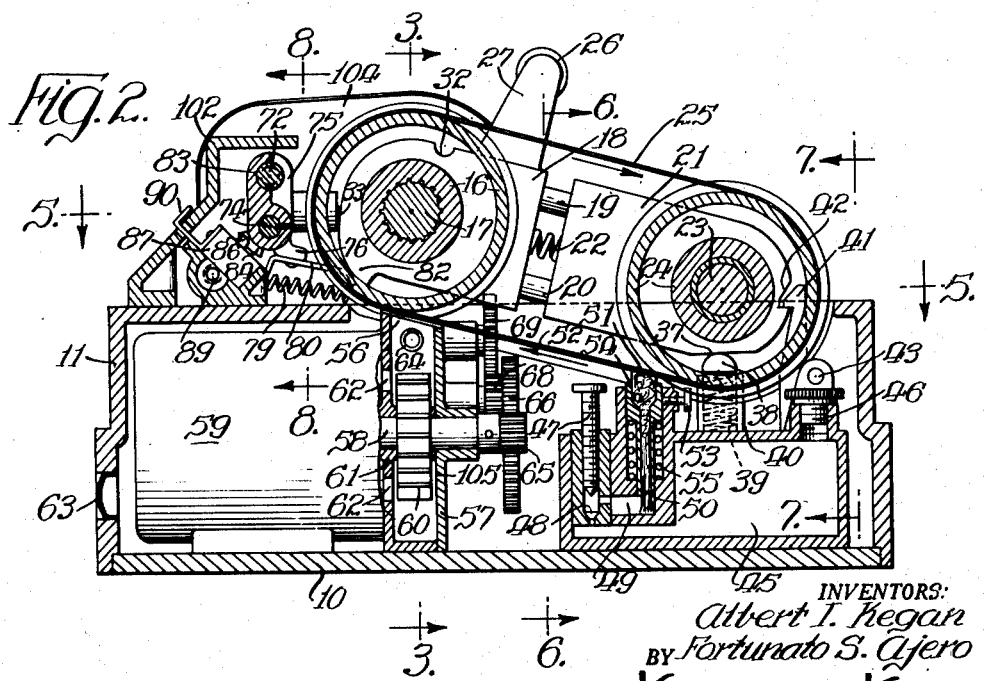

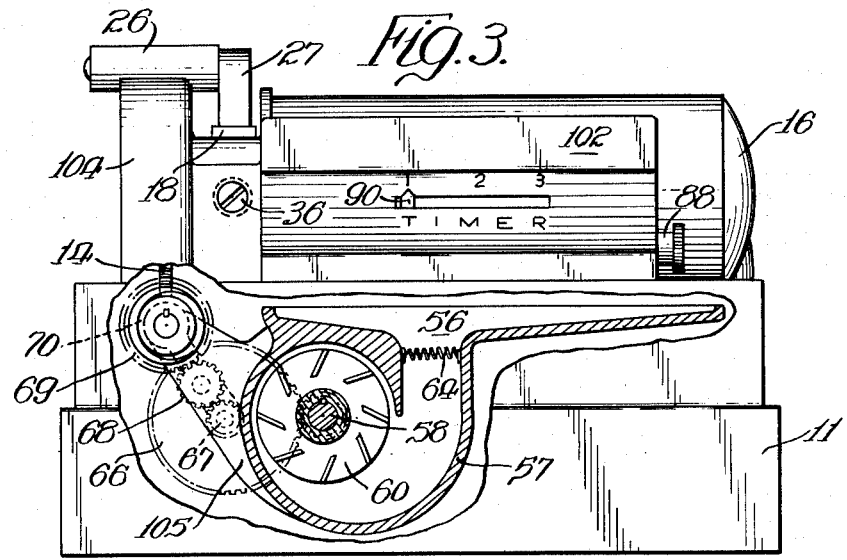
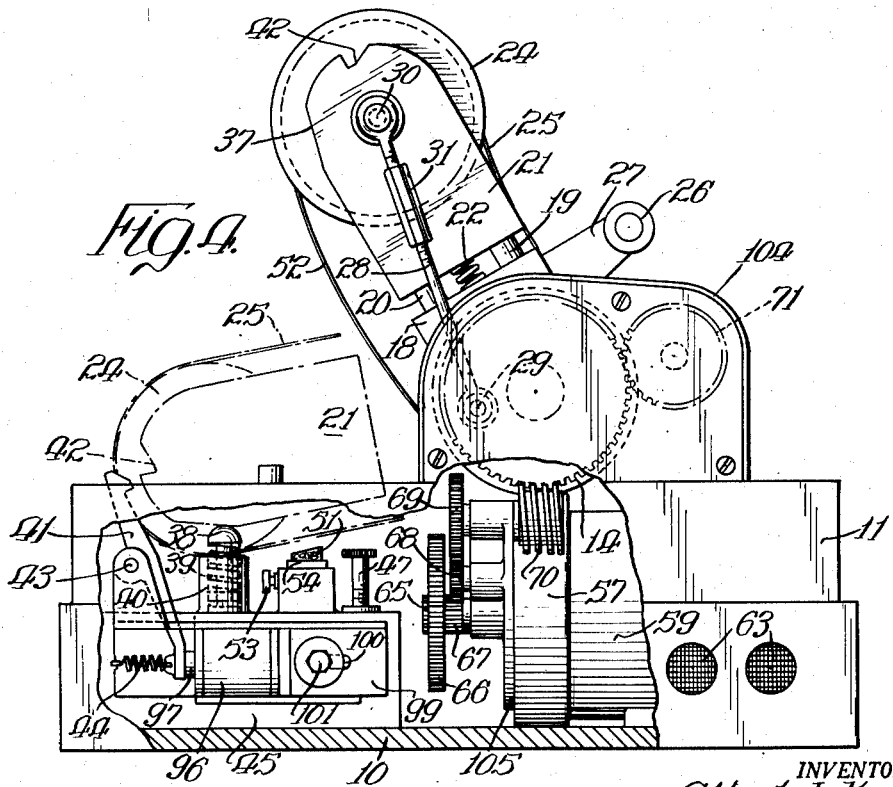

INVENTORS:
Albert I. Kegan
BY Fortunato S. Ajero
Kegan and Kegan
Attys.

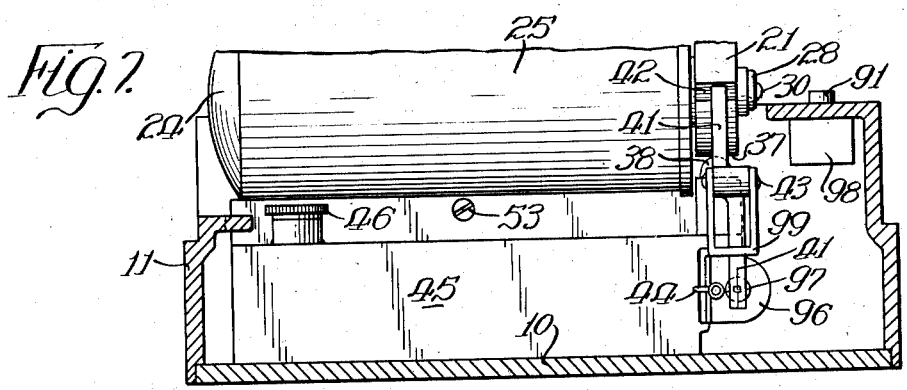

Patented Sept. 9, 1952

2,609,789

UNITED STATES PATENT OFFICE 2,609,789

APPARATUS FOR RESURFACING PLASTIC RECORD BELTS AND THE LIKE

Albert I. Kegan and Fortunato S. Ajero, Chicago, Ill., assignors, by direct and mesne assignments, to Samuel W. Kipnis as trustee for Judith Kegan, Daniel Kegan, and Franklin Kegan Application February 1, 1950, Serial No. 141,818

8 Claims. (Cl. 118—209)

Our invention relates to novel apparatus for reprocessing plastic endless belt-type sound recordings and the like.

A principal object of our invention is to provide compact, easily operated apparatus which effectively obliterates sound tracks formed in plastic belt-type records, by the use of solvents only.

Another object of our invention is to provide novel apparatus adapted to apply the apparatus principles set forth in the co-pending patent application of Albert I. Kegan, Serial No. 141,819, filed January 31, 1950, now abandoned, and entitled Method of and Apparatus for Resurfacing Plastic Phonograph Records or the Like, especially as said principles apply to solvent erasing of belt-type records.

The aforesaid patent application of Albert I. Kegan discloses that surface irregularities in certain types of plastics may be removed by merely wetting the plastic surface with a suitable solvent until softened, whereupon internal stresses on the plastic material cause a flow of material which obliterates the surface strains, and thereafter removing the solvent from the plastic surface, as by evaporation. Our invention provides a novel apparatus for applying this principle to the reprocessing of endless belt-type records, such as the thin plastic record belts that have come into use in recent years in the dictating machine art to replace wax cylindrical records. While we do not restrict our invention to the reprocessing of any particular type of plastic materials, or to any particular solvents, our invention is especially well adapted to removal of sound tracks in endless belt records formed from thin ethyl cellulose sheet material, using solvents such as carbon tetrachloride, acetone and ethyl acetate for this purpose. Ethyl cellulose is the principal material used commercially for record belts, while the solvents named are inexpensive, yet give excellent results.

In its broad aspect, our novel apparatus comprises a framework on which a belt-type record may be placed in looped configuration and thereafter placed under slight tension, a solvent applicator, and a solvent reservoir therefor, means for positioning the framework relative to the solvent applicator to bring the latter into contact with the record belt, and means for moving the record belt relative to the applicator, whereby solvent may be applied to the belt record. We have discovered that unless the thin record belt is placed under tension that the solvent acts to warp and distort the record belt to the point that it cannot be used in the sound recording machines for which it is intended.

Apparatus of the type specified is characterized by the following special features and advantages: (1) The record belt is at no time appreciably distorted by solvent action even though it may be composed of very thin, flexible plastic material, since the belt is held under slight tension in a looped configuration during reprocessing. (2) The mechanism may be fully enclosed while the device is in the operating position, to protect the operator against possibility of injury. (3) The reprocessing may be carried out automatically, so that the apparatus may be used by untrained operators. (4) No material is removed from the belt surface being refinished either during cutting or during reprocessing, hence the record belt can be repeatedly resurfaced and reused. (5) A small quantity of solvent is ordinarily sufficient to obliterate completely the sound track formed in the record surface so that belts can be reprocessed at small cost.

In order that our invention may be more fully disclosed, reference is had to the accompanying drawings which illustrate one form of apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that our invention is not restricted to the particular details recited in the specification, or shown in the drawings.

Figure 1 is a plan view of record reprocessing apparatus embodying our invention;

Figure 2 is a right side elevational view taken in section on the line 2—2 of Figure 1, with part of the casing of the drive motor broken away to show interior details thereof;

Figure 3 is a front elevational view with parts thereof broken away to show details of the operating mechanism;

Figure 4 is a left side elevational view of the apparatus in the loading position, with parts broken away to show interior details, an intermediate position of the record carrying mechanism being shown in dotted outline;

Figure 7 is a fragmentary rear elevational view taken in section on the line 7—7 of Figure 2;

Figure 8 is a fragmentary rear elevational view taken in section on the line 8—8 of Figure 2;

Figure 9 is a fragmentary right side elevational view taken in section on the line 9—9 of Figure 1, with the belt carrying mechanism shown in the loading position; and Figure 10 is a schematic view of the control mechanism of the apparatus.

Like reference characters designate like parts in the drawings and in the description thereof which follows.

Figure 5:
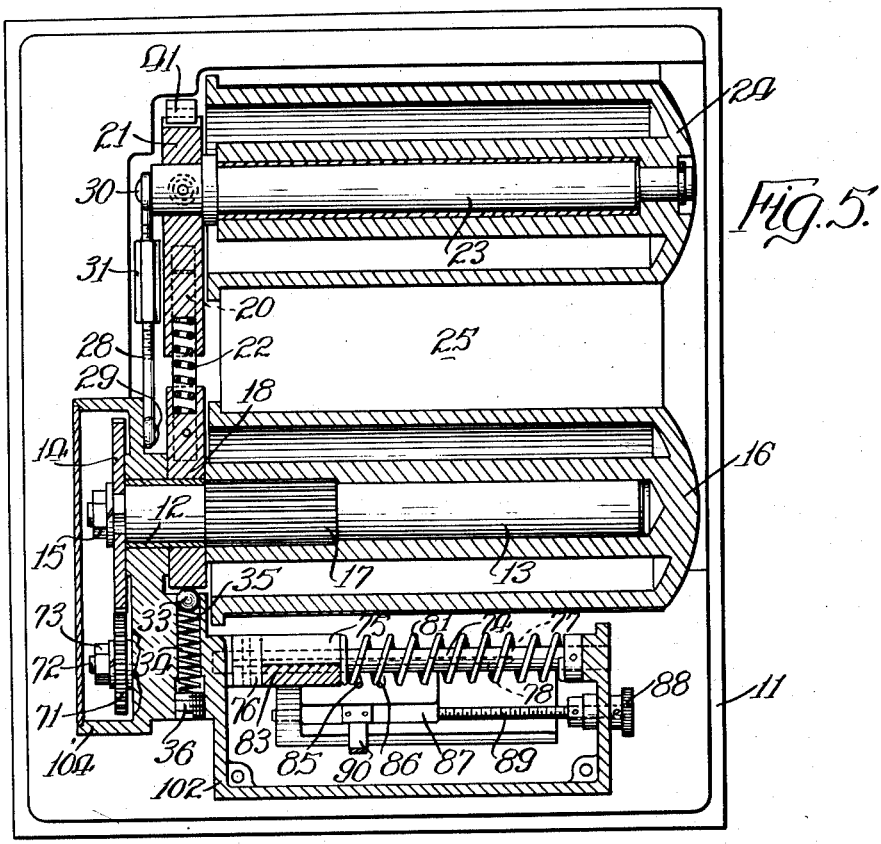
Figure 5 is a plan view taken in section on the line 5—5 of Figure 2.
Figure 6:
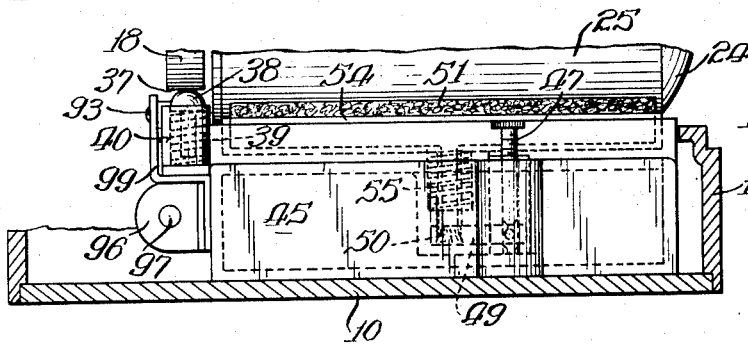
Figure 6 is a fragmentary front elevational view taken in section on the line 6—6 of Figure 2.

Before proceeding with a detailed description of the construction and operation of the several parts comprising the embodiment shown in the drawings, and to indicate better the broad concepts of our invention, the organization and coaction of the principal parts comprising said embodiment may be described in brief outline as follows:

Said apparatus includes (1) a framework adapted to hold a record belt in looped configuration, together with means for operating the framework to place the record under tension to prevent distortion when solvent is applied to the record; (2) means for applying solvent to the belt when tensioned on the framework; (3) means for moving the record belt and the solvent applying means relative to each other; and (4) mechanism adapted to integrate the actions of the foregoing elements in a timed, automatic control sequence. When the solvent applied to the record is volatile, it is not essential that specific means be provided for its removal, since it will evaporate into the surrounding air. Preferred embodiments of our invention include, however, means for heating and moving air currents across the treated surface of the record to accelerate evaporation. The operation of the air heating and moving means may of course be integrated with the operation of the other elements of the apparatus.

I. Record positioning mechanism

Customarily the record belts which are to be reprocessed are thin and flaccid. If the records are unsupported during reprocessing, they frequently become warped and distorted by the uncontrolled action of the solvent to such an extent that they become useless as recording media, even though the sound track in the record may be completely obliterated. In the embodiment shown, however, the record belt being treated is at all times well supported by a framework, and distortion thereby prevented.

As shown in the drawings, said embodiment includes a base 10, a main housing 11, and a gear housing 104 having a sleeve bearing 12 (Figure 5). A stub or cantilever shaft 13 having a driven gear wheel 14 secured to one end thereof by the nut 15, is journaled in the sleeve bearing 12. A driven mandrel 16 is secured to the cantilever shaft 13 by the fluted portion 17. Intermediate the driven roller or mandrel 16 and the gear housing 104 is a member 18, also rotatable about the sleeve bearing 12. A pair of guide pins 19 and 20 extend substantially radially from the member 18, Fig. 4, and provide means for slidably guiding the member 21 toward and away from the member 18. A helical spring 22 is positioned between the members 18 and 21 and acts to separate the member 21 from the member 18. As best shown in Figure 5, another cantilever shaft 23 is secured to the member 21, and extends therefrom substantially parallel to cantilever shaft 13. An idler roller or mandrel 24 is rotatably mounted on the shaft 23 and forms with the driven mandrel 16 the supporting means for holding a record belt 25 taut in looped configuration.

By grasping the handle 26 of the lever 27 extending from the member 18, said member 18 and the mechanism carried thereby may be swung about the sleeve bearing 12 between the extremities of position shown in Figures 2 and 4. A connecting spacer rod 28 joins the gear housing 104 and the member 21, one end of the connecting spacer rod 28 being secured to said housing 104 by the pin 29, while the other end is secured to the member 21 by the pin 30. A turnbuckle 31 provides means for adjusting the effective length of the connecting spacer rod 28. As is best shown in Figure 4, the pin 29 is eccentrically mounted with respect to the axis of rotation of the member 18; hence as the idler roller 24 is rotated from the position shown in Figure 4 to that shown in Figure 2, the effective center to center distance between the driven roller or mandrel 16 and the idler mandrel 24 increases. By adjusting the length of the connecting rod 28, using the turnbuckle 31 for this purpose, the distance between the mandrels 16 and 24 in the position shown in Figure 2 may be set to place the record belt 25 under slight tensioning, so that rotation of the driven roller or mandrel 16 causes the record belt 25 to move about the roller 16 in the manner of an endless pulley belt. When the rollers 16 and 24 are in the position shown in Figure 4, however, the record belt 25 is afforded sufficient slack and may be easily placed upon or removed from said mandrels 16 and 24. As best shown in Figure 9, a cylindrical surface of member 18 includes a notch 32 which may be engaged by the spring loaded detent ball 33 whilst in the loading position of Figure 4. As best shown in Figure 5, the poppet or detent ball 33 and its associated spring 34 are positioned within the bore 35 in the gear housing 104, and are retained in place by the plug 36.

As the idler roller 24 is swung down into the position shown in dotted outline in Figure 4, the flat 37 on the member 21 contacts the spring loaded pin 38. Movement of the idler roller 24 beyond this position causes the loading spring 39 of the pin 38 to compress within the cup shaped well 40 (Figure 10). As the idler roller 24 reaches the position shown in Figure 2, the latch 41 snaps into the notch 42 in the member 21, to hold the mandrel 24 in the operating position. The latch 41 pivots about the pin 43 and is held in engagement with the notch 42 by the spring 44.

II. Record belt driving mechanism

To propel the belt 25 about the rollers 16 and 24, the operator presses the starting button 91, which displaces the switch bar 92 (Figure 10) downwardly into latching engagement by the spring-loaded armature 93 of the solenoid 94. When the switch bar 92 is in the "down" position, the contact 95 bridges the circuit between the source 103 of electrical energy and the drive motor 59, whereupon the drive shaft 58 of the motor 59 rotates.

Referring now to Figures 2, 3, and 4, the driven gear wheel 14 is drivably connected to the drive shaft 58 through a gear train comprising the spur gear 65 secured to the drive shaft 58, and the spur gears 66, 67, 68, 69 and the driving worm 70 carried by the bracket 105 extending from the blower housing 57. Through this gear train the angular velocity of the shaft 13 and the driven mandrel 16 may be very much reduced from that of the drive shaft 58, so that the record belt 25 moves slowly upon energization of the drive motor 59.

III. Solvent applicator means

Referring again to Figure 2, the device is shown as including a solvent reservoir 45 positioned substantially beneath the idler mandrel or roller 24 when the latter is in the operating position shown in said figure. The solvent reservoir may be filled with an appropriate solvent through the filler plug 46. A needle valve 47 adapted to seat against the valve seat 48 provides means for regulating the rate of flow of solvent from the solvent reservoir 45 to the passageway 49, as well as for shutting off the flow altogether. A wick 50 extends into the passageway 49 and feeds solvent to the solvent applicator wick 51, which is positioned to be in brushing contact with the lower span 52 of the record belt 25 when the idler mandrel 24 is in the operating position. To adjust the vertical height of the solvent applicator wick 51 we provide a set screw 53 which engages the sleeve 54, which sleeve 54 is in turn urged upwardly by the spring 55.

As the record belt 25 moves in the direction shown by the arrows of Figure 2, the solvent applicator 51 applies a thin film of solvent to the outer surface of said record 25, which carries the sound track to be obliterated. The rate with which solvent is applied to the belt record 25 may be adjusted by means of the needle valve 47, as previously mentioned. Advantageously, the solvent applicator 51 need bear against the lower span 52 of the record belt 25 only to the extent necessary to insure a steady flow of solvent onto said record belt 25. Thus there is little if any rubbing or abrasive action on the material from which the record belt 25 is made, especially since the applicator 51 may be of such non-abrasive materials as felt, sponge rubber, or layers of absorbent cotton cloth sewn together.

When too much solvent is applied to the record 25, the excess drains back toward the applicator 51 rather than coalescing into drops of liquid, due to the mandrel 24 being lower than the mandrel 16.

IV. *Solvent removal means*

As the treated surface of the record belt 25 moves past the solvent applicator 51 and toward the driven mandrel 16, some of the solvent will evaporate into the air, the amount depending on the volatility of the solvent. As the belt 25 continues to move, it passes over the outlet 56 of the blower housing 57, from which a current of air is discharged against the treated surface of the belt 25. The blower wheel 60 within the housing 57 is keyed to the shaft 58 of the drive motor 59, and will accordingly be rotated at high speed. As shown in Figure 2, the side 61 of the blower housing 57 forming part of the casing for the drive motor 59, is perforated by the vents 62, 62, which act as inlet ports for the housing 57. Thus, all air which is drawn into the blower housing 57 must first pass over the windings of drive motor 59, and is therefore heated to a temperature which is considerably above the ambient room temperature. Air is in turn supplied to the drive motor 59 through the intake ports 63 in the main housing 11 (Figures 2 and 4). To further heat the air before it is discharged from the outlet 56, an electrical resistor 64 is positioned in the blower housing 57 just below the outlet 56. As shown in Figure 10, the resistor 64 may be connected in series with the drive motor 59.

V. *Control mechanism*

Referring now to Figures 4, 5 and 8, the worm wheel 14 is drivably connected to the spur gear 71, which gear 71 is secured to the lead screw 72 by the nut 73. Since the pitch diameter of the worm 70 is relatively large, compared to the thickness of the worm wheel 14, the individual teeth of the worm wheel 14 are substantially straight across, and may be meshed with the spur gear 71 without difficulty, especially since the angular velocities of the wheel 14 and the gear 71 are low. Thus, as the driven mandrel 16 turns to move the record belt 25, the lead screw 72 turns a proportionate amount.

Positioned within the upper housing 102 substantially parallel to the lead screw 72 is a shaft 74, along which the carriage 75 is movable. An arm 76 is positioned at one end of the shaft 74 and is drivably connected with the carriage 75 by the key 77 operating in the keyway 78. Thus, as the arm 76 turns, the carriage 75 turns similarly, even though spaced along the shaft 74 from the arm 76. When the member 18 is in the loading position, the carriage 75 is held in the position shown in Figure 9 by the spring 79, which acts on the link 80 carried by the arm 76. When the carriage 75 is in this latter position, the spring 81 on the shaft 74 presses against the carriage 75 and holds it in against the arm 76.

Upon swinging the member 18 into the operating position, the camming surface 82 thereon moves the link 80 to the position shown in Figure 2, thereby causing the arm 76 to turn in a counter clockwise direction. As a result, the carriage 75 pivots on the shaft 74 to bring the half-nut 83 into driving engagement with the lead screw 72.

Projecting substantially downwardly from the carriage 75 is a switch trip 84 which is adapted to actuate the switches 85 and 86 forming part of the unit 87, shown schematically in Figure 10. The position of the unit 87 relative to the lead screw 72 may be adjusted by means of the knob 88 and the adjustment screw 89, the pointer 90 providing an indication as to the position of the unit 87 relative to the upper housing 102.

Contact of the switch trip 84 with the switch 85 closes the circuit between the solenoid 96 and the source 103 of electrical energy, whereupon the armature 97 rocks the latch 41 clockwise, as viewed in Figure 10, to disengage said latch 41 from the notch 42 in the member 21. The action of the latch 41 may be adjusted to insure disengagement from the notch 42, by moving the supporting bracket 99 of the solenoid 96 relative to the main housing 11 by means of the slot 100 and the bolt 101.

While the switch trip 84 is still in engagement with the switch 85, it may also contact and close the switch 86 which acts to ground the solenoid 94. When this occurs, the spring loaded armature 93 of the solenoid 94 releases the switch arm 92, whereupon the spring 106 moves the button 91 and the contact 95 to the "up" position. This breaks the circuit of the drive motor 59 and the resistor 64, thereby stopping the apparatus.

VI. *Operation of apparatus*

The application and advantages of our invention will be more fully realized upon considering the following description of one full cycle of operation of the embodiment shown in the drawings.

The apparatus is initially in the position shown in Figure 4, the driven mandrel 16 and the idler mandrel 24 being spaced apart a distance which enables the record belt 25 to be easily slipped thereover. The operator first adjusts the needle valve 47 to obtain the desired flow of solvent to the applicator 51, and then grasps the handle 26 to swing the idler mandrel 24 to the position shown in Figure 2, whence it is locked in place by engagement of the latch 41 with the notch 42. As the idler mandrel 24 is rotated into this position, the mandrels 16 and 24 separate to tension the record belt 25, with the lower span 52 in brush contact with the solvent applicator 51. The operator next presses the button 91 of the starting switch unit 98, to energize the drive motor 59 and electrical resistor 94. When this occurs, the drive motor 59 turns the shaft 13 through the inter-connecting gear train thereby driving the driven mandrel 16. Rotation of the mandrel 16 results in the applicator 51 despositing a thin film of solvent upon the lower span 52 of the moving record belt 25. A portion of this solvent evaporates into the surrounding air. The remainder is driven off as the treated surface moves over the outlet port 56 of the blower housing 57, from which a current of heated air is discharged. Before the solvent is removed from the record belt 25, however, it has sufficient time in which to act on the record material to remove all traces of the sound track previously formed therein.

When the member 18 is in the loading position, the half-nut 83 of the carriage 75 is out of contact with the lead screw 72; hence the spring 81 holds the carriage 75 in the position shown in Figure 8. Upon lowering the idler mandrel 24 to the operating position, however, the half-nut 83 engages the lead screw 72. As the driven mandrel 16 turns when the apparatus is in this latter position, the carriage 75 moves to the left, as viewed in Figure 8, at a rate proportional to the angular velocity of the mandrel 16. As previously mentioned, the position of the unit 87 may be adjusted relative to the upper housing 102 by the adjustment screw 89, so that the distance between the switches 85 and 86 and the switch trip 84 on the carriage 75 at the start of the cycle may be varied to obtain the particular number of revolutions of the record 25 about the mandrels 16 and 24 which are necessary to obliterate the sound track. Thus, with the embodiment shown, the unit 87 may be positioned so that the record belt 25 rotates one, two or three times before the cycle is terminated.

As the switch trip 84 engages and closes the switch 85, the latch 41 disengages from the notch 42, whereupon member 21 moves upwardly by the spring loaded pin 38 to the position shown in dotted outline in Figure 4. When the idler mandrel 24 is in this position, the record belt 25 is out of engagement with the solvent applicator 51 and thus no more solvent is applied to the record belt 25. However, the distance between the mandrels 16 and 24 is still sufficient to impart some movement to belt 25.

As the switch trip 84 continues to move relative to the lead screw 72, it closes the switch 86 whereupon the spring loaded armature 93 disengages from the switch arm 92 to break the circuit leading to the drive motor 59 and the electrical resistor 64. The time required for the switch trip 84 to bridge the distance between the switches 85 and 86 is such, however, that all portions of the record belt 25 which have been wetted by the solvent applicator 51 pass over the outlet 56 before the motor 59 and the resistor 64 are deenergized. This insures that all solvent is removed from the belt 25 at the end of the operating cycle so that said belt 25 is dry to the touch to permit its removal from the apparatus immediately.

When the drive motor 59 stops, the switch trip 84 still remains in engagement with the switches 85 and 86; consequently the latch 41 remains out of engagement with the notch 42. To remove the reprocessed belt record 25 from the apparatus, the operator grasps the handle 26, and swings the idler mandrel 24 back to the loading position. The belt 25 may then be easily slipped off from the mandrels 16 and 24.

As the member 18 is swung into the loading position, the spring 79 returns the link 80 to the position shown in Figure 9. The resultant rotation of the arm 76 disengages the half-nut 83 from the lead screw 72. When this occurs, the compressed spring 81 reacts on the carriage 75, to move the latter to the starting position shown in Figure 8. The switches 85 and 86 thereupon return to the open position, thus deenergizing the solenoids 94 and 96, to place them in readiness for the next cycle of operation. If the apparatus is not to be used again immediately, it is desirable to close the needle valve 47 to prevent loss of the volatile solvent from the solvent reservoir 45 through the wick 50 and the solvent applicator 51.

Thus it will be seen that we have perfected apparatus which is adapted to the reprocessing of belt-type records and the like by the use of solvents. Moreover, preferred embodiments of our invention are so constructed that the operator need only place the used record belt in the apparatus, operate a lever to place the apparatus in the operating position, and press an electrical switch element, whereupon the old sound track is removed from the record automatically, without further attention on the part of the operator.

While we have shown and described a preferred embodiment of our invention, it is to be understood that this embodiment has been given by way of example only, and that various changes and rearrangements of the details shown herein may be made without departing from the spirit of the invention, the scope of which is defined in the appended claims.

We claim:

1. Apparatus for reprocessing a record belt with solvent, comprising: a frame, a first member and means for pivoting said first member relative to said frame, a driven mandrel rotatably mounted on said first member, drive means for said mandrel, a second member, means connecting said second member to said first member for movement radially of said driven mandrel, an idler mandrel extending from said second member substantially parallel to said driven mandrel, means for turning said second member about said driven mandrel between a first and a second position, a connecting rod, means pivotally connecting one end of said rod to said member eccentric of said driven mandrel, means pivotally connecting the other end of said rod to said second member concentric with said idler mandrel, whereby the distance of said idler mandrel from said driven mandrel increases as said second member is moved from said first position to said second position, spring means yieldably opposing movement of said second member a short distance before said member reaches said second position, releasable locking means holding said second member in said second position, a lead screw driven by said drive means, a carriage movable along said lead screw, a half nut on said carriage positionable to drivably connect said carriage to said lead screw, means actuated by said first member to engage said half nut with said lead screw as said second member is moved to said second position, a spring opposing movement of said carriage along said lead screw in one direction, a solvent applicator in brush contact with a record belt placed over said mandrels when in said second position, a solvent reservoir and a conduit connecting said reservoir to said applicator, valve means in said conduit, a blower spaced from said applicator and positioned to direct a stream of air against said record belt on said mandrels, first control means actuated by said carriage following movement of said carriage along said lead screw in said one direction for a predetermined distance, said actuated first control means releasing said locking means holding said second member in said second position whereby said spring means displace said second member away from said second position to disengage said record belt from said solvent applicator, and second control means actuated by said carriage as said carriage displaces in additional predetermined distance along said lead screw in said one direction, said actuated second control means stopping said drive means and said blower.

2. Apparatus for reprocessing a record belt with solvent, comprising: a first mandrel and a second mandrel, means spacing said mandrels apart, means for swinging said second mandrel relative to said first mandrel between a first and a second position, means increasing the distance between said first and second mandrels as said second mandrel moves to said second position, the spacing between said mandrels in said second position being such that a belt record looped around said mandrels is placed under tension, drive means operatively connected to at least one of said mandrels, a solvent reservoir, a solvent applicator connected to said solvent reservoir and positioned to contact said record belt when said second mandrel is in said second position, spring means positioned to engage said second mandrel just prior to contact of said record belt with said solvent applicator upon movement of said second mandrel into said second position, said spring means opposing movement of said second mandrel into said second position, releasable lock means holding said second mandrel in said second position, a lead screw drivably connected to said drive means, a carriage movable along said lead screw, means releasably connecting said carriage to said lead screw to drive said carriage in one direction, means actuating said last-mentioned means upon moving said second mandrel to said second position, means actuated by said carriage to release said releasable locking means, whereby said spring means cause said record belt to move out of contact with said solvent applicator, and other spring means acting to drive said carriage in the opposite direction along said lead screw when said second mandrel is moved to said first position.

3. Apparatus for reprocessing a record belt with solvent, comprising: a first mandrel and drive means therefor, a second mandrel, a frame spacing said second mandrel from said first mandrel, means for pivoting said frame to move said second mandrel between a first position and a second position, means increasing the distance between said mandrels as said second mandrel is moved from said first position to said second position, the spacing between said mandrels in said second position being such that a record belt looped around said mandrels is placed under tension, releasable lock means retaining said second mandrel in said second position, means actuating said drive means, a solvent reservoir, a solvent applicator positioned to contact said record belt when said second mandrel is in said second position, means connecting said applicator to said solvent reservoir, control means for releasing said lock means a predetermined time following actuation of said drive means, and means acting on said frame to move said record belt out of contact with said solvent applicator upon release of said lock means.

4. Apparatus for reprocessing a record belt with solvent, comprising: a first mandrel and a second mandrel, means spacing said mandrels apart, means for swinging said second mandrel relative to said first mandrel between a first and a second position, means increasing the distance between said first and second mandrels as said second mandrel moves to said second position, the spacing between said mandrels in said second position being such that a record belt looped around said mandrel is placed under tension, drive means operatively connected to at least one of said mandrels, means for holding said second mandrel in said second position, means for releasing said last-mentioned means, a solvent reservoir, a solvent applicator connected to said solvent reservoir and positioned to engage said record belt when said second mandrel is in said second position, and means acting on said second mandrel to move said record belt out of contact with said solvent applicator upon release of said means holding said second mandrel in said second position.

5. Apparatus for reprocessing a record belt with solvent, comprising: a frame, a first shaft rotatably supported by said frame, drive means for said first shaft, a driven mandrel rotatable with said first shaft, a first member rotatable about said first shaft, a second member, guide means slidably pairing said first and second member for movement of said second member substantially radially of said first shaft, an idler mandrel, means rotatably connecting said idler mandrel to said second member, said idler mandrel being substantially parallel to said driven mandrel, means causing said second member to slide radially outwardly relative to said first member as said second member is rotated about said first shaft from a first position to a second position, the distance between said mandrels when in said second position being such that a record belt looped over said mandrels is placed under tension, and means for applying a solvent to said belt record when said mandrels are in said second position.

6. Apparatus for reprocessing a record belt with solvent, comprising: a first mandrel and a second mandrel, means for revolving one of said mandrels about the axis of the other between a belt loading position and a reprocessing position, means for varying the lateral spacing between said mandrels during said movement, whereby in said loading position said mandrels are moved closer together to enable looping a record belt thereover and whereby in said reprocessing position said mandrels are moved farther apart to tension said record belt thereover, a solvent reservoir, a solvent applicator communicating with said reservoir and positioned to be out of contact with said record belt in said loading position and in contact with said record belt in said reprocessing position, means releasably latching said mandrels in said reprocessing position, and means for rotating one of said mandrels at a slow rate of speed and causing said belt to be moved longitudinally about its loop to present successive areas into contactual engagement with said solvent applicator.

7. Apparatus for reprocessing a record belt with solvent comprising: a first roller and a second roller, journal means supporting said rollers for movement laterally toward and away from one another between loading and resurfacing positions to vary the distance between said rollers, whereby when close together a record belt may be looped thereover, and whereby when farther apart said looped record belt is held taut, solvent applicator means positioned to be out of contact with said record belt in the loading position of said mandrels, and to contact said record belt when pulled taut, a motor driven reduction gear train for imparting rotation to one of said rollers and thereby to said record belt and means releasably locking said mandrels when said belt is pulled taut.

8. A machine for treating endless belts which carry sound tracks comprising, a drive roller supported upon a cantilever shaft, a power train for imparting rotation to said cantilever shaft, an extensible arm revolving around said shaft through a predetermined arc from a belt replacement position to a belt reprocessing position, a second shaft carried at the extremity of said arm and disposed parallel to said cantilever shaft, an idler roller carried on said second shaft, a link pivotally connecting the extremity of said arm with a stationary part of the machine whereby during the revolving of said arm about said cantilever shaft it is extended when moved toward the belt reprocessing position and withdrawn when moved toward said belt replacement position, and a reprocessing solvent applicator disposed to engage the belt while said arm and said second shaft are in said reprocessing position.

ALBERT I. KEGAN.
FORTUNATO S. AJERO.

REFERENCES CITED

The following references are of record in the file of this patent:

UNITED STATES PATENTS

| Number | Name | Date |
|---|---|---|
| 429,079 | Austin | May 27, 1890 |
| 926,764 | Phillips | July 6, 1909 |
| 1,378,344 | Hails | May 17, 1924 |
| 1,928,235 | Taylor | Sept. 26, 1933 |

FOREIGN PATENTS

| Number | Country | Date |
|---|---|---|
| 462,791 | Great Britain | Mar. 16, 1937 |